United States Patent
Oishi et al.

(10) Patent No.: US 11,292,482 B2
(45) Date of Patent: Apr. 5, 2022

(54) CONTROL DEVICE FOR VEHICLE AND VEHICLE CONTROL PROGRAM

(71) Applicant: TOYOTA JIDOSHA KABUSHIKI KAISHA, Toyota (JP)

(72) Inventors: Toshiya Oishi, Nagoya (JP); Tsutomu Miyazaki, Miyoshi (JP); Toshihiro Nishimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/319,335

(22) Filed: May 13, 2021

(65) Prior Publication Data
US 2021/0380121 A1 Dec. 9, 2021

(30) Foreign Application Priority Data
Jun. 8, 2020 (JP) .............................. JP2020-099387

(51) Int. Cl.
| | |
|---|---|
| *G06F 7/12* | (2006.01) |
| *B60W 50/04* | (2006.01) |
| *B60W 10/06* | (2006.01) |
| *B60W 40/107* | (2012.01) |

(52) U.S. Cl.
CPC .......... *B60W 50/045* (2013.01); *B60W 10/06* (2013.01); *B60W 40/107* (2013.01); *B60W 2540/10* (2013.01); *B60W 2710/0666* (2013.01)

(58) Field of Classification Search
CPC .. B60W 10/06; B60W 40/107; B60W 50/045; B60W 2540/10; B60W 2710/0666
See application file for complete search history.

(56) References Cited

U.S. PATENT DOCUMENTS

| | | | | |
|---|---|---|---|---|
| 4,893,526 A | * | 1/1990 | Tokoro | B60W 30/18 |
| | | | | 477/43 |
| 2012/0290187 A1 | | 11/2012 | Oesterreicher et al. | |
| 2017/0120924 A1 | * | 5/2017 | Oshiumi | B60K 6/445 |
| 2020/0158034 A1 | * | 5/2020 | Suzuki | F02D 41/22 |
| 2020/0158036 A1 | * | 5/2020 | Suzuki | F02D 13/0261 |
| 2021/0380121 A1 | * | 12/2021 | Oishi | B60W 10/06 |

FOREIGN PATENT DOCUMENTS

| | | |
|---|---|---|
| JP | 2009-062998 A | 3/2009 |
| JP | 2017-014974 A | 1/2017 |

OTHER PUBLICATIONS

"Standardized E-Gas Monitoring Concept for Gasoline and Diesel Engine Control Units" Jul. 13, 2015. pp. 1-57.

* cited by examiner

*Primary Examiner* — John Kwon
(74) *Attorney, Agent, or Firm* — Oblon, McClelland, Maier & Neustadt, L.L.P.

(57) ABSTRACT

In a torque-based detection process, a control device detects an excess acceleration state of a vehicle when a duration time of a state in which a value obtained by subtracting a required torque from an actual torque of an internal combustion engine is equal to or greater than a torque threshold value is equal to or greater than a torque determination time. In an acceleration-based detection process, the control device detects the excess acceleration state of the vehicle when a duration time of a state in which a value obtained by subtracting a required acceleration from an actual acceleration of the vehicle is equal to or greater than an acceleration threshold value is equal to or greater than an acceleration determination time.

6 Claims, 4 Drawing Sheets

CONTROL DEVICE FOR VEHICLE AND VEHICLE CONTROL PROGRAM

CROSS-REFERENCE TO RELATED APPLICATION

This application claims priority to Japanese Patent Application No. 2020-099387 filed on Jun. 8, 2020, incorporated herein by reference in its entirety.

BACKGROUND

1. Technical Field

The present disclosure relates to a control device for a vehicle and a vehicle control program.

2. Description of Related Art

A control device for an internal combustion engine disclosed in Japanese Unexamined Patent Application Publication No. 2017-014974 (JP 2017-014974 A) calculates a required torque for the internal combustion engine based on an amount of depression of an accelerator pedal of a vehicle. The control device calculates an actual torque which is an actual output torque of the internal combustion engine based on an operating state of the internal combustion engine. When a state in which an excess of the actual torque with respect to the required torque is equal to or greater than a threshold value has continued for a predetermined determination time, the control device determines that the internal combustion engine is in an excess torque state. When the internal combustion engine is in the excess torque state, the vehicle is in an excess acceleration state which is a state in which the acceleration of the vehicle is higher than a required acceleration required by a driver.

SUMMARY

In the technique disclosed in JP 2017-014974 A, an actual torque or a required torque may not be accurately calculated for certain reasons. For example, an abnormality may occur in a control circuit that calculates the actual torque or the required torque. The control circuit may not be able to acquire parameters which are required to calculate the actual torque or the required torque due to an abnormality in a communication system or the like. When the actual torque or the required torque cannot be accurately calculated for such reasons, an excess torque state, that is, an excess acceleration state, may not be accurately detected.

According to an aspect of the present disclosure, there is provided a control device for a vehicle that is applied to a vehicle including an internal combustion engine which is a drive source, the control device performing: a required torque calculating process of calculating a required torque which is a required value of an output torque for the internal combustion engine based on an amount of depression of an accelerator pedal of the vehicle; an actual torque calculating process of calculating an actual torque which is an actual output torque of the internal combustion engine based on an operating state of the internal combustion engine; a torque-based detection process of detecting an excess acceleration state of the vehicle when a duration time of a state in which a value obtained by subtracting the required torque from the actual torque is equal to or greater than a predetermined torque threshold value is equal to or greater than a predetermined torque determination time; a required acceleration calculating process of calculating a required acceleration which is a required value of an acceleration for the vehicle based on the amount of depression of the accelerator pedal of the vehicle; an actual acceleration calculating process of calculating an actual acceleration which is an actual acceleration of the vehicle based on a traveling state of the vehicle; an acceleration-based detection process of detecting the excess acceleration state of the vehicle when a duration time of a state in which a value obtained by subtracting the required acceleration from the actual acceleration is equal to or greater than a predetermined acceleration threshold value is equal to or greater than a predetermined acceleration determination time; and a fail-safe process of taking a measure for releasing the excess acceleration state when the excess acceleration state of the vehicle has been detected in at least one of the torque-based detection process and the acceleration-based detection process.

An output torque of an internal combustion engine and an acceleration of a vehicle are parameters which are independent from each other. Information which is required to calculate a torque difference which is a difference between an actual torque and a required torque is different from information which is required to calculate an acceleration difference which is a difference between an actual acceleration and a required acceleration. Accordingly, even when it is difficult to acquire information required to calculate the torque difference or the like and the torque difference cannot be accurately calculated, there is a low likelihood of calculation of the acceleration difference being affected thereby and the acceleration difference can be accurately calculated. In addition, even when it is difficult to acquire information required to calculate the acceleration difference or the like and the acceleration difference cannot be accurately calculated, there is a low likelihood of calculation of the torque difference being affected thereby and the torque difference can be accurately calculated. In this way, by monitoring for the excess acceleration state of the vehicle using two independent parameters including the output torque of the internal combustion engine and the acceleration of the vehicle, the likelihood that the excess acceleration state will be able to be accurately detected using at least one of the two parameters is increased. Accordingly, it is possible to prevent omission of detection of the excess acceleration state.

In the control device for a vehicle, the torque threshold value may be an output torque of the internal combustion engine which is required to cause an acceleration of the acceleration threshold value in the vehicle, and the acceleration determination time may be longer than the torque determination time.

With this configuration, for example, erroneous detection of noise or the like of a sensor which is used to calculate the acceleration difference can be prevented in detecting the excess acceleration state using the acceleration. In the control device for a vehicle, the acceleration-based detection process may include measuring the duration time of the state in which the value obtained by subtracting the required acceleration from the actual acceleration is equal to or greater than the acceleration threshold value on condition that a traveling speed of the vehicle is equal to or greater than a predetermined stop determination vehicle speed.

Immediately before the vehicle stops or immediately after the vehicle starts, the acceleration of the vehicle may change greatly. With this change in acceleration, the acceleration difference may be equal to or greater than the acceleration threshold value. On the other hand, when the traveling speed of the vehicle is very low such as immediately before the vehicle stops or immediately after the vehicle starts, there is no problem in traveling of the vehicle even if the acceleration difference is equal to or greater than the acceleration threshold value. With this configuration, in a situation in which the excess acceleration state does not need to be detected such as immediately before the vehicle stops or immediately after the vehicle starts, it is possible to prevent detection of the excess acceleration state and unnecessary execution of the fail-safe process.

In the control device for a vehicle, the acceleration-based detection process may include measuring the duration time of the state in which the value obtained by subtracting the required acceleration from the actual acceleration is equal to or greater than the acceleration threshold value on condition that an automatic transmission connected to the internal combustion engine is not performing gear shift.

When the automatic transmission is performing gear shift, an acceleration based on the gear shift of the automatic transmission is generated in the vehicle. With this configuration, it is possible to detect the excess acceleration state separately from change of the acceleration due to normal operations of the vehicle.

In the control device for a vehicle, the acceleration-based detection process may include measuring the duration time of the state in which the value obtained by subtracting the required acceleration from the actual acceleration is equal to or greater than the acceleration threshold value on condition that the vehicle is not traveling reversely on an uphill road.

When the vehicle travels reversely on an uphill road, that is, when the vehicle slips down on the uphill road, the acceleration of the vehicle may change greatly and the acceleration difference may be equal to or greater than the acceleration threshold value. On the other hand, when the excess acceleration state is unnecessarily detected and the fail-safe process is performed in a situation other than a normal traveling situation which is rightful for detection such as slipping-down of the vehicle, traveling performance of the vehicle may deteriorate. With this configuration, it is possible to prevent unnecessary detection of the excess acceleration state.

According to another aspect of the present disclosure, there is provided a vehicle control program causing a control device that is applied to a vehicle including an internal combustion engine which is a drive source to perform: a required torque calculating process of calculating a required torque which is a required value of an output torque for the internal combustion engine based on an amount of depression of an accelerator pedal of the vehicle; an actual torque calculating process of calculating an actual torque which is an actual output torque of the internal combustion engine based on an operating state of the internal combustion engine; a torque-based detection process of detecting an excess acceleration state of the vehicle when a duration time of a state in which a value obtained by subtracting the required torque from the actual torque is equal to or greater than a predetermined torque threshold value is equal to or greater than a predetermined torque determination time; a required acceleration calculating process of calculating a required acceleration which is a required value of an acceleration for the vehicle based on the amount of depression of the accelerator pedal of the vehicle; an actual acceleration calculating process of calculating an actual acceleration which is an actual acceleration of the vehicle based on a traveling state of the vehicle; an acceleration-based detection process of detecting the excess acceleration state of the vehicle when a duration time of a state in which a value obtained by subtracting the required acceleration from the actual acceleration is equal to or greater than a predetermined acceleration threshold value is equal to or greater than a predetermined acceleration determination time; and a fail-safe process of taking a measure for releasing the excess acceleration state when the excess acceleration state of the vehicle has been detected in at least one of the torque-based detection process and the acceleration-based detection process.

An output torque of an internal combustion engine and an acceleration of a vehicle are parameters which are independent from each other. Information which is required to calculate a torque difference which is a difference between an actual torque and a required torque is different from information which is required to calculate an acceleration difference which is a difference between an actual acceleration and a required acceleration. Accordingly, even when it is difficult to acquire information required to calculate the torque difference or the like and the torque difference cannot be accurately calculated, there is a low likelihood of calculation of the acceleration difference being affected thereby and the acceleration difference can be accurately calculated. In addition, even when it is difficult to acquire information required to calculate the acceleration difference or the like and the acceleration difference cannot be accurately calculated, there is a low likelihood of calculation of the torque difference being affected thereby and the torque difference can be accurately calculated. In this way, by monitoring for the excess acceleration state of the vehicle using two independent parameters including the output torque of the internal combustion engine and the acceleration of the vehicle, the likelihood that the excess acceleration state will be able to be accurately detected using at least one of the two parameters is increased. Accordingly, it is possible to prevent omission of detection of the excess acceleration state.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a control device for a vehicle according to an embodiment of the present disclosure will be described with reference to the accompanying drawings.

First, a rough configuration of a vehicle will be described below.

Figure 1:
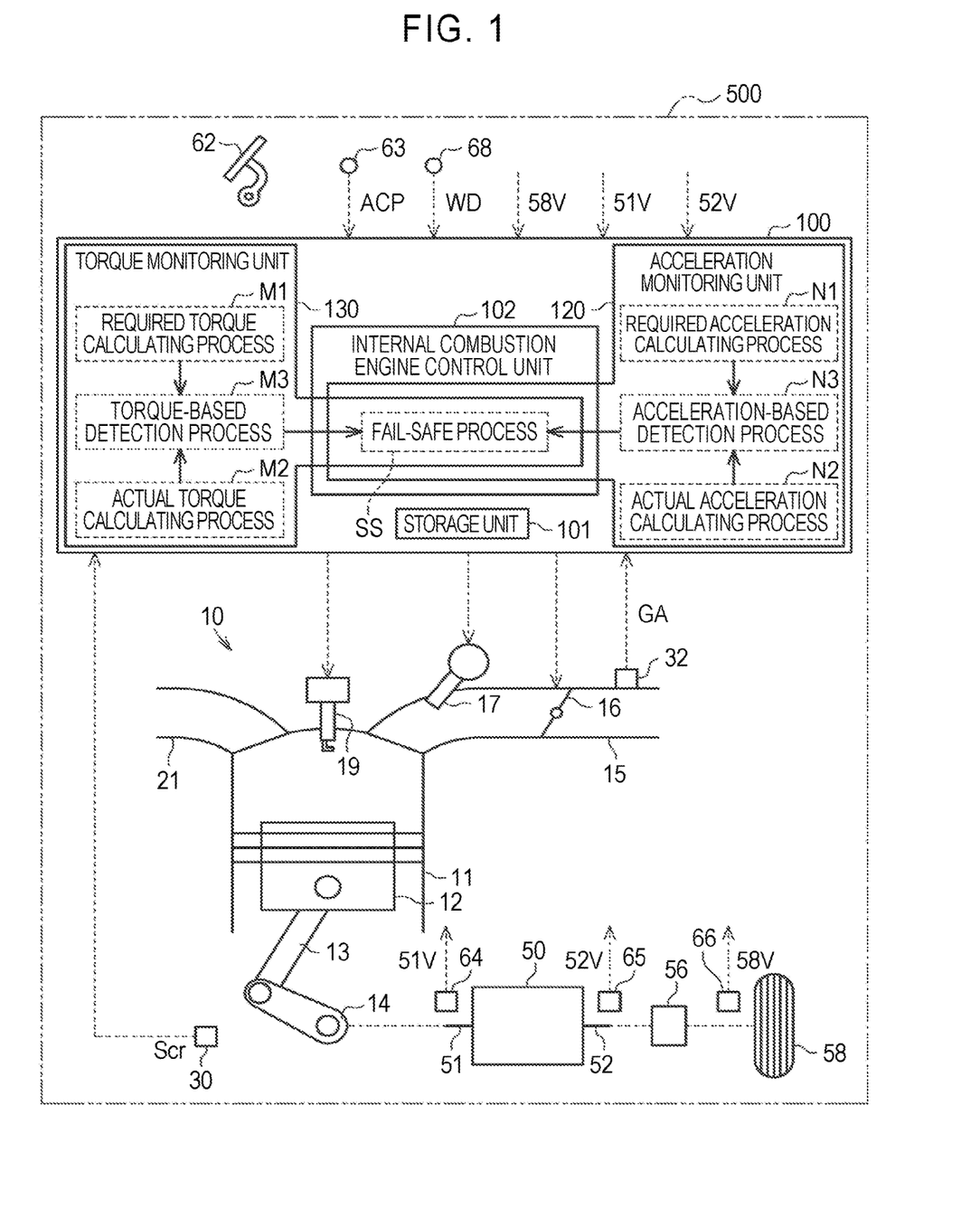
FIG. 1 is a diagram schematically illustrating a configuration of a vehicle.

As illustrated in FIG. 1, an internal combustion engine 10 which is a drive source of a vehicle 500 is mounted in the vehicle 500. The internal combustion engine 10 includes a cylinder 11 in which a mixture gas of fuel and intake air is combusted. A plurality of cylinders 11 is provided, but only one cylinder is illustrated in FIG. 1. A piston 12 is accommodated in the cylinder 11 such that it can reciprocate. The piston 12 is connected to a crank shaft 14 via a connecting rod 13. The crank shaft 14 rotates with reciprocation of the piston 12. A crank angle sensor 30 that detects a rotational position Scr of the crank shaft 14 is disposed in the vicinity of the crank shaft 14.

An intake passage 15 that is used to introduce intake air from the outside into the cylinder 11 is connected to the cylinder 11. An air flowmeter 32 that detects an amount of intake air GA flowing in the intake passage 15 is provided in the middle of the intake passage 15. In the intake passage 15, a throttle valve 16 that adjusts the amount of intake air GA introduced into the cylinder 11 is provided downstream from the air flowmeter 32. In the intake passage 15, a fuel injection valve 17 that injects fuel is provided downstream from the throttle valve 16. An exhaust passage 21 that is used to discharge exhaust gas in the cylinder 11 to the outside is connected to the cylinder 11. A tip of an ignition plug 19 that ignites the mixture gas in the cylinder 11 is located in the cylinder 11.

An input shaft 51 of a multi-stage automatic transmission 50 is connected to the crank shaft 14 which is an output shaft of the internal combustion engine 10. Although not illustrated, a plurality of clutches and brakes which are engagement elements and a plurality of planetary gear mechanisms are interposed between the input shaft 51 and an output shaft 52 of the automatic transmission 50. In the automatic transmission 50, a gear stage is changed by switching engaged/disengaged states of the engagement elements. An input shaft rotation sensor 64 that detects a rotational position 51V of the input shaft 51 is provided in the vicinity of the input shaft 51 of the automatic transmission 50. An output shaft rotation sensor 65 that detects a rotational position 52V of the output shaft 52 is provided in the vicinity of the output shaft 52 of the automatic transmission 50.

The output shaft 52 of the automatic transmission 50 is connected to wheels 58 via a differential 56 and the like. A wheel speed sensor 66 that detects a wheel speed 58V which is a rotation speed of the corresponding wheel 58 is provided in the vicinity of each wheel 58.

An accelerator pedal 62 that is operated by a driver is provided in the vehicle 500. An accelerator position sensor 63 that detects an accelerator operation amount ACP which is an amount of depression of the accelerator pedal 62 is provided in the vehicle 500. An acceleration sensor 68 that detects an acceleration in a longitudinal direction of the vehicle 500 as a detection acceleration WD is also provided in the vehicle 500.

A control configuration of the vehicle 500 will be described below.

A control device 100 that controls various constituent units of the vehicle 500 is mounted in the vehicle 500. The control device 100 can be constituted by one or more processors that perform various processes in accordance with a computer program (software). The control device 100 may be constituted by one or more dedicated hardware circuits such as an application-specific integrated circuit (ASIC) that performs at least a part of various processes or circuitry including such a combination. The processor includes a CPU and a memory such as a RANI and a ROM. The memory stores program codes or instructions configured to cause the CPU to perform processing. The memory, that is, a computer-readable medium, includes all available media which can be accessed by a general-purpose or dedicated computer. The control device 100 includes a nonvolatile storage unit 101. Various maps which are used to control various constituent units of the vehicle 500 are stored in the storage unit 101.

Detection signals from various sensors that are provided in the vehicle 500 are input to the control device 100. Specifically, detection signals for the following parameters are input to the control device 100.

- A rotational position Scr of the crank shaft 14 which is detected by the crank angle sensor 30
- An amount of intake air GA which is detected by the air flowmeter 32
- An accelerator operation amount ACP which is detected by the accelerator position sensor 63
- A rotational position 51V of the input shaft 51 of the automatic transmission 50 which is detected by the input shaft rotation sensor 64
- A rotational position 52V of the output shaft 52 of the automatic transmission 50 which is detected by the output shaft rotation sensor 65
- Wheel speeds 58V which are detected by the wheel speed sensors 66
- A detection acceleration WD which is detected by the acceleration sensor 68

The control device 100 calculates an engine rotation speed NE which is a rotation speed of the crank shaft 14 per unit time based on the rotational position Scr of the crank shaft 14. The control device 100 calculates a rotation speed 51Y of the input shaft 51 per unit time based on the rotational position 51V of the input shaft 51 of the automatic transmission 50. The control device 100 calculates a rotation speed 52Y of the output shaft 52 per unit time based on the rotational position 52V of the output shaft 52 of the automatic transmission 50. The control device 100 calculates a vehicle speed SP which is a traveling speed of the vehicle 500 based on the wheel speeds 58V.

The control device 100 includes an internal combustion engine control unit 102 that controls the internal combustion engine 10. In normal control, the internal combustion engine control unit 102 calculates a required torque which is a required value of an output torque of the internal combustion engine 10 based on the accelerator operation amount ACP and the vehicle speed SP. The internal combustion engine control unit 102 performs various types of control of the internal combustion engine 10 such that an actual output torque of the internal combustion engine 10 reaches the required torque. The internal combustion engine control unit 102 controls, for example, an amount of fuel injected from the fuel injection valve 17, a degree of opening of the throttle valve 16, and an ignition timing of the ignition plug 19. A method of calculating a required torque will be described later in detail in association with processes which are performed by other functional units.

Here, the vehicle 500 may enter an excess acceleration state in which an actual acceleration is excessive with respect to a required acceleration required by a driver. Such an excess acceleration state can be caused, for example, due to accumulation of errors in control of the internal combustion engine 10 or errors of amounts of operation based on deterioration of various constituent units of the internal combustion engine 10. The control device 100 includes a torque monitoring unit 130 which is a functional unit that monitors for the excess acceleration state of the vehicle 500. The torque monitoring unit 130 monitors for the excess acceleration state of the vehicle 500 using the output torque of the internal combustion engine 10. The torque monitoring unit 130 can perform a torque monitoring process which is a process of monitoring for the excess acceleration state of the vehicle 500.

The torque monitoring unit 130 performs a required torque calculating process M1 of calculating a required torque T1 for the internal combustion engine 10 as a part of the torque monitoring process. The required torque T1 is a required value of the output torque for the internal combustion engine 10 as described above. The torque monitoring unit 130 calculates the required torque T1 based on the accelerator operation amount ACP and the vehicle speed SP.

The torque monitoring unit 130 performs an actual torque calculating process M2 of calculating an actual torque T2 which is an actual output torque of the internal combustion engine 10 as a part of the torque monitoring process. The torque monitoring unit 130 calculates the actual torque T2 based on parameters indicating an operating state of the internal combustion engine 10. In this embodiment, parameters indicating the operating state of the internal combustion engine 10 include the amount of intake air GA, the engine rotation speed NE, and the ignition timing of the ignition plug 19.

The torque monitoring unit 130 performs a torque-based detection process M3 of detecting the excess acceleration state of the vehicle 500 as a part of the torque monitoring process. In the torque-based detection process M3, the torque monitoring unit 130 detects the excess acceleration state of the vehicle 500 when a duration time of a state in which a torque difference T3 which is a value obtained by subtracting the required torque T1 from the actual torque T2 is equal to or greater than a torque threshold value TZ is equal to or greater than a torque determination time TH. The torque monitoring unit 130 stores the torque threshold value TZ and the torque determination time TH in advance.

The torque monitoring unit 130 performs a fail-safe process SS of taking a measure for releasing the excess acceleration state of the vehicle 500 as a part of the torque monitoring process. In this embodiment, a measure for releasing the excess acceleration state of the vehicle 500 is to stop an output of the internal combustion engine 10. The torque monitoring unit 130 performs the fail-safe process using the internal combustion engine control unit 102. Specifically, the torque monitoring unit 130 outputs a fail-safe execution signal to the internal combustion engine control unit 102.

When the fail-safe execution signal is acquired, the internal combustion engine control unit 102 performs fail-safe control in a predetermined period. When the fail-safe control is performed, the internal combustion engine control unit 102 cancels normal control. The internal combustion engine control unit 102 calculates the required torque as zero in the fail-safe control. Then, the internal combustion engine control unit 102 controls the internal combustion engine 10 such that the actual torque of the internal combustion engine 10 reaches zero. That is, the internal combustion engine control unit 102 stops the output of the internal combustion engine 10. The internal combustion engine control unit 102 stores the predetermined time in advance. The predetermined time is determined as a time required to release the excess acceleration state of the vehicle 500 and is determined by experiment or simulation.

The control device 100 includes an acceleration monitoring unit 120 which is a functional unit that monitors for the excess acceleration state of the vehicle 500 using the acceleration of the vehicle 500. The acceleration monitoring unit 120 can perform an acceleration monitoring process which is a process of monitoring for the excess acceleration state of the vehicle 500.

The acceleration monitoring unit 120 performs a required acceleration calculating process N1 of calculating a required acceleration W1 which is a required value of the acceleration of the vehicle 500 as a part of the acceleration monitoring process. The acceleration monitoring unit 120 calculates the required acceleration W1 based on the accelerator operation amount ACP and the vehicle speed SP.

The acceleration monitoring unit 120 performs an actual acceleration calculating process N2 of calculating an actual acceleration W2 which is an actual acceleration of the vehicle 500 as a part of the acceleration monitoring process. The acceleration monitoring unit 120 calculates the actual acceleration W2 based on parameters indicating a traveling state of the vehicle 500. In this embodiment, the parameters indicating the traveling state of the vehicle 500 include a detection acceleration WD detected by the acceleration sensor 68.

The acceleration monitoring unit 120 performs an acceleration-based detection process N3 of detecting the excess acceleration state of the vehicle 500 as a part of the acceleration monitoring process. In the acceleration-based detection process N3, the acceleration monitoring unit 120 detects the excess acceleration state of the vehicle 500 when a duration time of a state in which an acceleration difference W3 which is a value obtained by subtracting the required acceleration W1 from the actual acceleration W2 is equal to or greater than an acceleration threshold value WZ is equal to or greater than an acceleration determination time WH. The acceleration monitoring unit 120 stores the acceleration threshold value WZ and the acceleration determination time WH in advance.

The acceleration monitoring unit 120 performs a fail-safe process SS of taking a measure for releasing the excess acceleration state of the vehicle 500 as a part of the acceleration monitoring process. Details of this fail-safe process SS are the same as the fail-safe process SS which is performed by the torque monitoring unit 130. That is, the acceleration monitoring unit 120 outputs a fail-safe execution signal to the internal combustion engine control unit 102 and stops the output of the internal combustion engine 10 using the internal combustion engine control unit 102.

Figure 4:
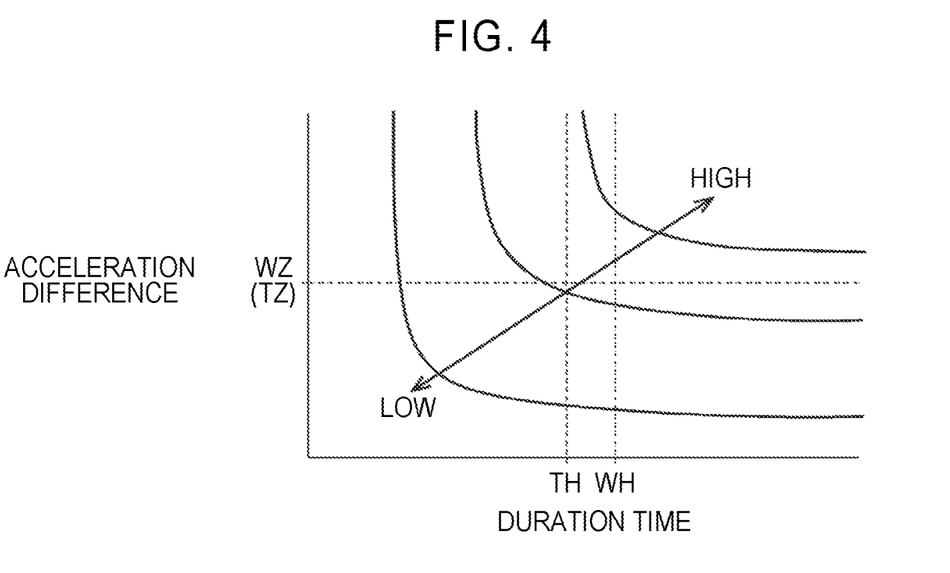
FIG. 4 is a diagram illustrating a relationship between an acceleration difference, a duration time of the acceleration difference, and a necessity of deceleration.

The acceleration threshold value WZ stored in the acceleration monitoring unit 120 and the torque threshold value TZ stored in the torque monitoring unit 130 will be described below. The acceleration threshold value WZ and the torque threshold value TZ are set in consideration of a necessity of deceleration of the vehicle 500. As illustrated in FIG. 4, the necessity of deceleration of the vehicle 500 which is defined using a product of two parameters as an index is expressed in an orthogonal coordinate system with the acceleration difference W3 and the duration time of the acceleration difference W3 as coordinate axes. At this time, the necessity of deceleration increases roughly as the acceleration difference W3 increases and as the duration time of the acceleration difference W3 increases. Specifically, when the acceleration difference W3 is small, the necessity of deceleration is low regardless of the duration time of the state in which the acceleration difference W3 is present. This is, for example, for reflecting that an inter-vehicle distance from a vehicle traveling in front is unlikely to decrease when the acceleration difference W3 is small. When the acceleration difference W3 is large, the necessity of deceleration becomes higher as the duration time of the acceleration difference W3 becomes greater. This is, for example, for reflecting that an inter-vehicle distance from a vehicle traveling in front thereof is likely to decrease when the state in which the acceleration difference W3 is large continues.

In this embodiment, a conformably large acceleration difference W3 is set as the acceleration threshold value WZ based on the necessity of deceleration of the vehicle 500. For example, the acceleration threshold value WZ is determined as an acceleration difference W3 at which an inter-vehicle distance from a preceding vehicle in an allowable range is likely to decrease when the vehicle 500 continues to travel to a certain extent with the same acceleration difference W3, and is determined by experiment or simulation. By setting a conformably large acceleration difference W3 as the acceleration threshold value WZ, it is possible to ascertain a situation in which an inter-vehicle distance from a preceding vehicle is likely to decrease and to perform the fail-safe process SS.

The output torque of the internal combustion engine 10 and the acceleration of the vehicle 500 have the following relationship. That is, as the output torque of the internal combustion engine 10 increases, the acceleration of the vehicle 500 increases. A value obtained by converting the acceleration threshold value WZ into the output torque of the internal combustion engine 10 based on this relationship is the torque threshold value TZ. That is, the torque threshold value TZ is the output torque of the internal combustion engine 10 which is required to cause the acceleration of the acceleration threshold value WZ to be generated in the vehicle 500.

The acceleration determination time WH stored in the acceleration monitoring unit 120 and the torque determination time TH stored in the torque monitoring unit 130 will be described below. As described above, the acceleration threshold value WZ is set to a conformably large acceleration difference W3. When the acceleration difference W3 is conformably large and a duration time thereof is short, a necessity of deceleration of the vehicle 500 is low. Accordingly, in this situation, it is not necessary to stop the output of the internal combustion engine 10 through the fail-safe process SS. On the other hand, when the acceleration difference W3 is conformably large and the duration time thereof is conformably long, the necessity of deceleration of the vehicle 500 is high. Accordingly, it is necessary to stop the output of the internal combustion engine 10 through the fail-safe process SS. That is, it is preferable that an excess acceleration state be detected and the fail-safe process SS be performed when a state in which the acceleration difference W3 is equal to or greater than the acceleration threshold value WZ continues to a certain extent.

The acceleration determination time WH is determined in consideration of errors or noise included in the detection values from various sensors associated with calculation of the acceleration difference W3 in addition to the aforementioned circumstances. Specifically, the acceleration difference W3 is calculated based on the detection acceleration WD detected by the acceleration sensor 68. In order to ascertain that the state in which the acceleration difference W3 is equal to or greater than the acceleration threshold value WZ has continued to a certain extent separately from errors or noise included in the detection acceleration WD, it is necessary to monitor for the acceleration difference W3 for a conformably long time. The acceleration determination time WH is determined as a length with which it can be reliably determined that the state in which the acceleration difference W3 is equal to or greater than the acceleration threshold value WZ has continued to a certain extent in consideration of errors or noise included in the detection acceleration WD and is determined by experiment or simulation.

The torque determination time TH is set based on the same idea as the acceleration determination time WH. That is, the torque determination time TH is determined as a length with which it can be reliably determined that the state in which the torque difference T3 is equal to or greater than the torque threshold value TZ has continued to a certain extent in consideration of errors or noise included in detection values from various sensors associated with calculation of the torque difference T3. Various sensors associated with calculation of the torque difference T3 are various sensors which are provided in the internal combustion engine 10 such as the air flowmeter 32.

Errors or noise included in the detection acceleration WD detected by the acceleration sensor 68 is likely to be greater than errors or noise included in the detection values from various sensors of the internal combustion engine. This is because the acceleration of the vehicle 500 is greater in an amount of change per unit time than that of various parameters of the internal combustion engine 10 such as the amount of intake air GA and the engine rotation speed. Since errors or noise included in the detection acceleration WD is greater than errors or noise included in the detection values from various sensors of the internal combustion engine 10, the acceleration difference W3 calculated using the detection acceleration WD is likely to have a greater calculation error than the torque difference T3 calculated using the detection values from various sensors of the internal combustion engine 10. Therefore, the length of the acceleration determination time WH is set to be longer than the torque determination time TH such that the excess acceleration state can be accurately detected using the acceleration difference W3 even when the calculation error of the acceleration difference W3 is slightly greater.

As the aforementioned setting result, the acceleration determination time WH increases conformably. The torque determination time TH is shorter than the acceleration determination time WH but is conformably long because it is necessary to ascertain continuity to a certain extent. The torque threshold value TZ and the acceleration threshold value WZ increase conformably. That is, in this embodiment, a state in which the necessity of deceleration of the vehicle 500 is conformably high is intensively monitored using two parameters of the acceleration of the vehicle 500 and the output torque of the internal combustion engine 10.

Figure 2:
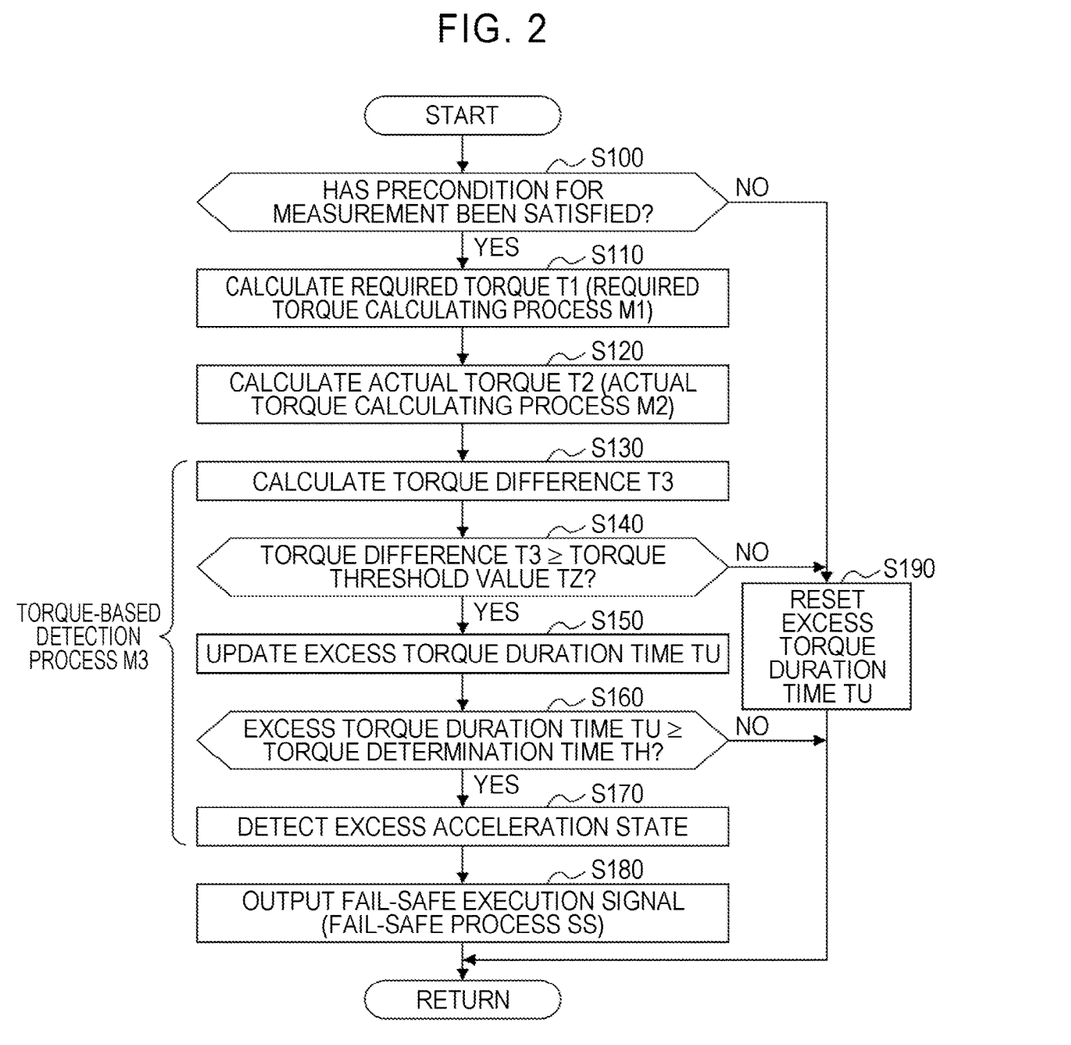
FIG. 2 is a flowchart illustrating a process routine of a torque monitoring process.

The torque monitoring process which is performed by the torque monitoring unit 130 will be described below. The torque monitoring unit 130 repeatedly performs the torque monitoring process at intervals of a predetermined execution cycle after an ignition switch of the vehicle 500 is turned on and until it is turned off. At a time point at which the ignition switch is turned on, an excess torque duration time TU which is the duration time of the state in which the torque difference T3 is equal to or greater than the torque threshold value TZ is zero.

As illustrated in FIG. 2, the torque monitoring unit 130 performs the process of Step S100 when the torque monitoring process is started. In Step S100, the torque monitoring unit 130 determines whether a precondition for measurement has been satisfied. The precondition for measurement includes a condition (MJ1) which is required to allow measurement of the excess torque duration time TU. The condition (MJ1) is a condition that various parameters associated with calculation of the torque difference T3 can be acquired.

The various parameters specifically include the amount of intake air GA, the engine rotation speed NE, the accelerator operation amount ACP, and the vehicle speed SP. Here, communication lines connecting the control device 100 to various sensors that detect the various parameters or parameters serving as the premises thereof may be disconnected. A connector of each communication line may depart from the input port of the control device 100. When such an abnormality of a communication system occurs, the detection values of the various sensors are not input to the control device 100. Even when the detection values of the various sensors are input to the control device 100, values which cannot be normally detected may be input due to an abnormality of the various sensors. The torque monitoring unit 130 receives newest values of the various parameters and determines to which of the following three patterns the received newest values correspond at the time at which Step S100 is performed.

(Pattern 1) The detection values of various sensors are not input to the control device 100 and various parameters cannot be acquired.

(Pattern 2) Various parameters can be acquired but the acquired values depart from values which can be normally detected as the various parameters.

(Pattern 3) Pattern 3 does not match Pattern 1 and Pattern 2.

In case of Pattern 1 or Pattern 2, the torque monitoring unit 130 determines that the condition (MJ1) has not been satisfied. On the other hand, in case of Pattern 3, the torque monitoring unit 130 determines that the condition (MJ1) has been satisfied. In case of Pattern 3, the torque monitoring unit 130 acquires various parameters without any change.

When the condition (MJ1) has not been satisfied, that is, when the precondition for measurement has not been satisfied (Step S100: NO), the torque monitoring unit 130 causes the process routine to proceed to Step S190. In Step S190, the torque monitoring unit 130 resets the excess torque duration time TU to zero. Thereafter, the torque monitoring unit 130 temporarily ends a series of processes of the torque monitoring process. Then, the torque monitoring unit 130 performs again the process of Step S100.

When the condition (MJ1) has been satisfied, that is, when the precondition for measurement has been satisfied (Step S100: YES), the torque monitoring unit 130 causes the process routine to proceed to Step S110. In Step S110, the torque monitoring unit 130 calculates the required torque T1. Specifically, the torque monitoring unit 130 refers to a driving force map which is stored in the storage unit 101. In the driving force map, a relationship between the accelerator operation amount ACP, the vehicle speed SP, and a required driving force is defined. The torque monitoring unit 130 calculates a required driving force F corresponding to the accelerator operation amount ACP and the vehicle speed SP acquired in Step S100 based on the driving force map. Thereafter, the torque monitoring unit 130 converts the required driving force F into the required torque T1 based on a gear ratio of a power transmission system including the automatic transmission 50 or a valid radius of the wheels 58. The aforementioned method of calculating the required torque T1 is the same as the method of calculating the required torque which is performed by the internal combustion engine control unit 102. The required torque T1 calculated by the torque monitoring unit 130 in Step S110 is the same as the newest required torque calculated by the internal combustion engine control unit 102. After performing the process of Step S110, the torque monitoring unit 130 causes the process routine to proceed to Step S120. The process of Step S110 is the required torque calculating process M1.

In Step S120, the torque monitoring unit 130 calculates the actual torque T2. Specifically, the torque monitoring unit 130 refers to a torque map which is stored in the storage unit 101. In the torque map, a relationship between the amount of intake air GA, the engine rotation speed NE, and the output torque of the internal combustion engine 10 is defined. The torque monitoring unit 130 calculates the output torque of the internal combustion engine 10 corresponding to the amount of intake air GA and the engine rotation speed NE acquired in Step S100 as a temporary torque based on the torque map. Then, the torque monitoring unit 130 acquires a newest value of a target value of an ignition timing of the ignition plug 19 which is calculated by the internal combustion engine control unit 102. The torque monitoring unit 130 refers to a correction torque map which is stored in the storage unit 101. In the correction torque map, a relationship between the ignition timing and a correction torque which is a correction value for the output torque of the internal combustion engine 10 is defined. The torque monitoring unit 130 calculates the correction torque corresponding to the ignition timing based on the correction torque map. Then, the torque monitoring unit 130 calculates the actual torque T2 by multiplying the temporary torque by the correction torque. After performing the process of Step S120, the torque monitoring unit 130 causes the process routine to proceed to Step S130. The process of Step S120 is the actual torque calculating process M2.

In Step S130, the torque monitoring unit 130 calculates the torque difference T3. Specifically, the torque monitoring unit 130 calculates a value obtained by subtracting the required torque T1 calculated in Step S110 from the actual torque T2 calculated in Step S120 as the torque difference T3. After performing the process of Step S130, the torque monitoring unit 130 causes the process routine to proceed to Step S140.

In Step S140, the torque monitoring unit 130 determines whether the torque difference T3 calculated in Step S130 is equal to or greater than the torque threshold value TZ. When the torque difference T3 is less than the torque threshold value TZ (Step S140: NO), the torque monitoring unit 130 causes the process routine to proceed to Step S190. The process of Step S190 is the same as described above.

On the other hand, when it is determined in Step S140 that the torque difference T3 is equal to or greater than the torque threshold value TZ (Step S140: YES), the torque monitoring unit 130 causes the process routine to proceed to Step S150.

In Step S150, the torque monitoring unit 130 updates the excess torque duration time TU. Specifically, the torque monitoring unit 130 calculates a value obtained by adding an execution cycle of the torque monitoring process to the current excess torque duration time TU as a newest excess torque duration time TU. After performing the process of Step S150, the torque monitoring unit 130 causes the process routine to proceed to Step S160.

In Step S160, the torque monitoring unit 130 determines whether the excess torque duration time TU is equal to or greater than the torque determination time TH. When the excess torque duration time TU is less than the torque determination time TH (Step S160: NO), the torque monitoring unit 130 temporarily ends a series of processes of the torque monitoring process. Then, the torque monitoring unit 130 performs again the process of Step S100.

On the other hand, when it is determined in Step S160 that the excess torque duration time TU is equal to or greater than the torque determination time TH (Step S160: YES), the torque monitoring unit 130 causes the process routine to proceed to Step S170. Here, the torque monitoring unit 130 repeatedly performs the torque monitoring process as described above. When the excess torque duration time TU is repeatedly updated without causing the determination result of Step S100 or S140 to be negative in this course of repetition, the excess torque duration time TU increases and the determination result of Step S160 becomes positive finally.

In Step S170, the torque monitoring unit 130 detects that the vehicle 500 is in the excess acceleration state. Then, the torque monitoring unit 130 causes the process routine to proceed to Step S180. The processes of Step S130 to S170 are the torque-based detection process M3.

In Step S180, the torque monitoring unit 130 outputs a fail-safe execution signal to the internal combustion engine control unit 102. When the fail-safe execution signal is acquired, the internal combustion engine control unit 102 performs fail-safe control for a predetermined time. When the fail-safe execution signal is acquired again in a state in which the fail-safe execution signal has been acquired and the fail-safe control is being performed, the internal combustion engine control unit 102 does not perform any process for the newly acquired fail-safe execution signal. That is, when fail-safe control is started in response to the firstly acquired fail-safe execution signal, the internal combustion engine control unit 102 ends the fail-safe control and returns to normal control at a time point at which a predetermined time elapses from that time point. The process of causing the torque monitoring unit 130 to output the fail-safe execution signal and the process of causing the internal combustion engine control unit 102 to control the internal combustion engine 10 as a result of the process are the fail-safe process SS. When the process of Step S180 has been completed, the torque monitoring unit 130 temporarily ends a series of processes of the torque monitoring process. Then, the torque monitoring unit 130 performs again the process of Step S100.

Figure 3:
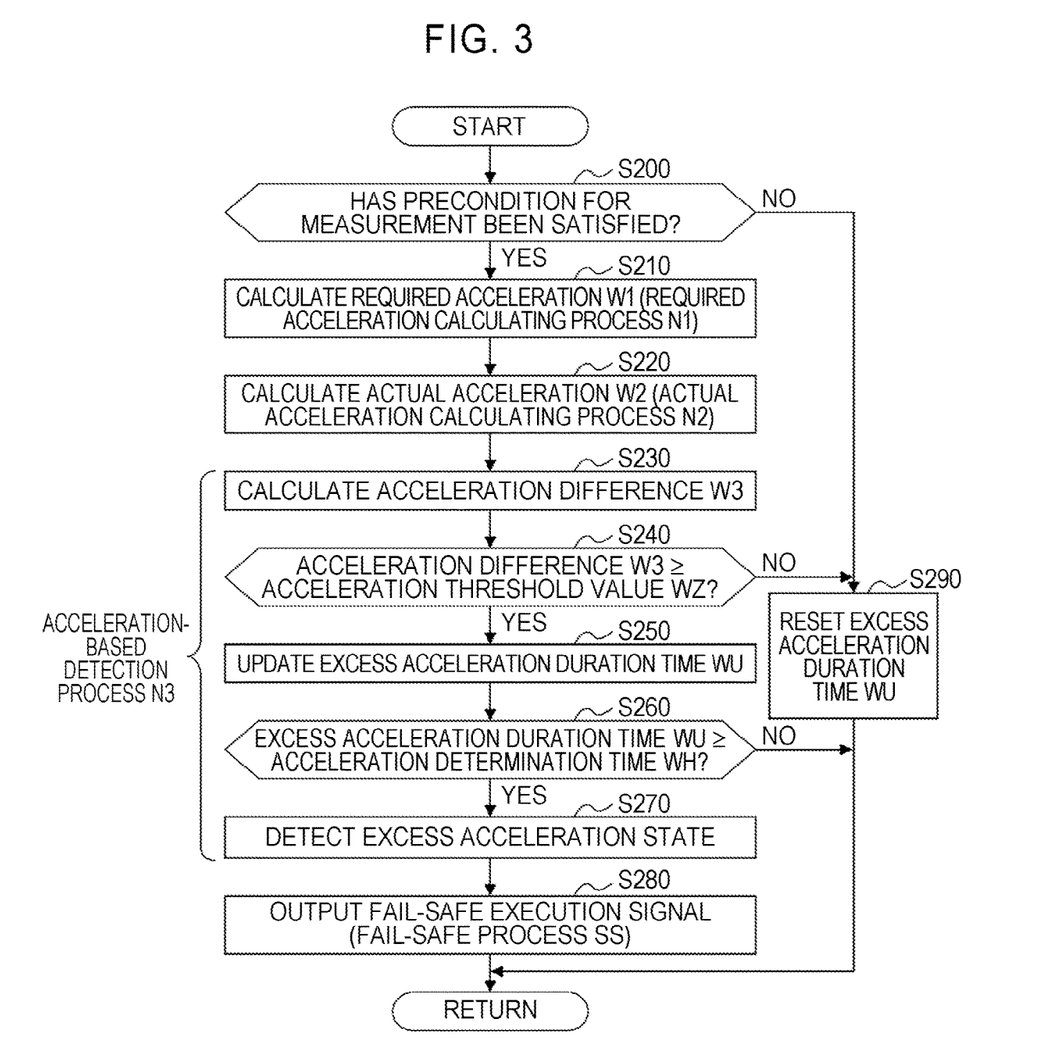
FIG. 3 is a flowchart illustrating a process routine of an acceleration monitoring process.

The acceleration monitoring process which is performed by the acceleration monitoring unit 120 will be described below. The acceleration monitoring unit 120 repeatedly performs the acceleration monitoring process at intervals of a predetermined execution cycle after the ignition switch of the vehicle 500 is turned on and until it is turned off. At a time point at which the ignition switch is turned on, an excess acceleration duration time WU which is the duration time of the state in which the acceleration difference W3 is equal to or greater than the acceleration threshold value WZ is zero.

As illustrated in FIG. 3, the acceleration monitoring unit 120 performs the process of Step S200 when the acceleration monitoring process is started. In Step S200, the acceleration monitoring unit 120 determines whether a precondition for measurement has been satisfied. The precondition for measurement includes various conditions which are required to allow measurement of the excess acceleration duration time WU. In this embodiment, the precondition for acceleration includes the following four conditions (NJ1) to (NJ4).

(NJ1) Various parameters associated with calculation of the acceleration difference W3 can be acquired.

(NJ2) The vehicle speed SP is equal to or higher than a stop determination vehicle speed.

(NJ3) The automatic transmission 50 is not performing gear shift.

(NJ4) The vehicle is not slipping down on an uphill road.

The condition (NH) is the same condition as the precondition for measurement in the torque monitoring process. The various parameters are specifically the detection acceleration WD, the accelerator operation amount ACP, and the vehicle speed SP. The acceleration monitoring unit 120 determines whether the condition (NJ1) has been satisfied in the same way as determining whether the condition (MJ1) has been satisfied in the torque monitoring process. When the condition (NJ1) has been satisfied, the acceleration monitoring unit 120 acquires various parameters.

In the condition (NJ2), the stop determination vehicle speed is determined in advance as a very low vehicle speed which can be taken immediately before the vehicle 500 stops or immediately after the vehicle 500 starts. Here, immediately before the vehicle 500 stops or immediately after the vehicle 500 starts, change of the acceleration of the vehicle 500 may increase. With this increase in change, the acceleration difference W3 may be equal to or greater than the acceleration threshold value WZ. On the other hand, when the vehicle speed SP is very low immediately before the vehicle 500 stops, there is no problem in traveling of the vehicle 500 even if the acceleration difference W3 is equal to or greater than the acceleration threshold value WZ. In this case, it is not necessary to stop the output of the internal combustion engine 10 by performing the fail-safe process SS. When a driver intends to increase the vehicle speed SP immediately after the vehicle 500 starts and the fail-safe process SS is performed to stop the output of the internal combustion engine 10, traveling performance of the vehicle 500 deteriorates. Therefore, it is preferable not to detect the excess acceleration state immediately before the vehicle 500 stops or immediately after the vehicle 500 starts. In this regard, the condition (NJ2) is set to prohibit measurement of the excess acceleration duration time WU immediately before the vehicle 500 stops or immediately after the vehicle 500 starts. The acceleration monitoring unit 120 determines whether the condition (NJ2) has been satisfied based on the vehicle speed SP at the time of performing Step S200.

In regard to the condition (NJ3), when the automatic transmission 50 is performing gear shift, an acceleration due to the gear shift operation of the automatic transmission 50 is caused in the vehicle 500. The acceleration based on this normal operation of the vehicle 500 is preferably excluded from accelerations used to detect the excess acceleration state which is an abnormal traveling state of the vehicle 500. In this regard, the condition (NJ3) is set to prohibit measurement of the excess acceleration duration time WU when the automatic transmission 50 is performing gear shift.

When the automatic transmission 50 is performing gear shift, a gear shift parameter which has a value obtained by dividing the rotation speed 51Y of the input shaft 51 of the automatic transmission 50 by the rotation speed 52Y of the output shaft 52 changes with time. The gear shift parameter increases at the time of downshift, and the gear shift parameter decreases at the time of upshift. Therefore, the acceleration monitoring unit 120 calculates a differential value of the gear shift parameter at the time of execution of Step S200. When the differential value of the gear shift parameter is zero, that is, when the gear shift parameter does not change with time, the acceleration monitoring unit 120 determines that the automatic transmission 50 is not performing gear shift. On the other hand, when the differential value of the gear shift parameter is not zero, that is, when the gear shift parameter changes with time, the acceleration monitoring unit 120 determines that the automatic transmission 50 is performing gear shift. The acceleration monitoring unit 120 determines whether the condition (NJ3) has been satisfied in this way.

In regard to the condition (NJ4), when a road gradient is larger relative to a driving force of the vehicle 500 at the time of starting of the vehicle 500 on an uphill road, the vehicle 500 may travel reversely in the direction opposite to the traveling direction, that is, may slip down on the uphill road. The condition (NJ4) is a condition associated with such a slip-down.

When the vehicle 500 slips down, the acceleration of the vehicle 500 may change greatly. With the great change in acceleration, the acceleration difference W3 may be equal to or greater than the acceleration threshold value WZ. However, when an excess acceleration state is detected with the slip-down of the vehicle 500, the output of the internal combustion engine 10 is stopped by the fail-safe process SS and traveling of the vehicle 500 is troubled. Therefore, the condition (NJ4) is set to prohibit measurement of the excess acceleration duration time WU when the vehicle 500 is slipping down.

The acceleration monitoring unit 120 determines whether the vehicle 500 is slipping down at the time of execution of Step S200. In this embodiment, the wheel speed 58V detected by the wheel speed sensor 66 has a positive value when the vehicle 500 travels forward, and has a negative value when the vehicle 500 travels reversely. When the gear stage of the automatic transmission 50 is set for forward travel and the wheel speed 58V has a negative value, that is, when the vehicle 500 travels reversely, the acceleration monitoring unit 120 determines that the vehicle 500 is slipping down.

When any of the conditions (NJ1) to (NJ4) is not satisfied, the acceleration monitoring unit 120 determines that the precondition for acceleration has not been satisfied (Step 200: NO). In this case, the acceleration monitoring unit 120 causes the process routine to proceed to Step S290. In Step S290, the acceleration monitoring unit 120 resets the excess acceleration duration time WU to zero. Thereafter, the acceleration monitoring unit 120 temporarily ends a series of processes of the acceleration monitoring process. Then, the acceleration monitoring unit 120 performs again the process of Step S200.

On the other hand, when it is determined in Step S200 that all the conditions (NJ1) to (NJ4) have been satisfied, the acceleration monitoring unit 120 determines that the precondition for acceleration has been satisfied (Step S200: YES). In this case, the acceleration monitoring unit 120 causes the process routine to proceed to Step S210.

In Step S210, the acceleration monitoring unit 120 calculates the required acceleration W1. Specifically, the acceleration monitoring unit 120 refers to a driving force map which is stored in the storage unit 101. The acceleration monitoring unit 120 calculates a required driving force F corresponding to the accelerator operation amount ACP and the vehicle speed SP acquired in Step S200 based on the driving force map. The acceleration monitoring unit 120 calculates a value obtained by dividing the required driving force F by the weight of the vehicle 500 as the required acceleration W1. The weight of the vehicle 500 mentioned herein includes an inertial mass which is a value obtained by replacing the moment of inertia of the internal combustion engine 10, the power transmission system, or the like with a weight. After performing the process of Step S210, the acceleration monitoring unit 120 causes the process routine to proceed to Step S220. The process of Step S210 is the required acceleration calculating process N1.

In Step S220, the acceleration monitoring unit 120 calculates the actual acceleration W2. Specifically, the acceleration monitoring unit 120 calculates the detection acceleration WD acquired in Step S200 as the actual acceleration W2. After performing the process of Step S220, the acceleration monitoring unit 120 causes the process routine to proceed to Step S230. The process of Step S220 is the actual acceleration calculating process N2.

In Step S230, the acceleration monitoring unit 120 calculates the acceleration difference W3. Specifically, the acceleration monitoring unit 120 calculates a value obtained by subtracting the required acceleration W1 calculated in Step S210 from the actual acceleration W2 calculated in Step S220 as the acceleration difference W3. After performing the process of Step S230, the acceleration monitoring unit 120 causes the process routine to proceed to Step S240.

In Step S240, the acceleration monitoring unit 120 determines whether the acceleration difference W3 calculated in Step S230 is equal to or greater than the acceleration threshold value WZ. When the acceleration difference W3 is less than the acceleration threshold value WZ (Step S240: NO), the acceleration monitoring unit 120 causes the process routine to proceed to Step S290. The process of Step S290 is the same as described above.

On the other hand, when it is determined in Step S240 that the acceleration difference W3 is equal to or greater than the acceleration threshold value WZ (Step S240: YES), the acceleration monitoring unit 120 causes the process routine to proceed to Step S250. In Step S250, the acceleration monitoring unit 120 updates the excess acceleration duration time WU. Specifically, the acceleration monitoring unit 120 calculates a value obtained by adding an execution cycle of the acceleration monitoring process to the current excess acceleration duration time WU as a newest excess acceleration duration time WU. After performing the process of Step S250, the acceleration monitoring unit 120 causes the process routine to proceed to Step S260.

In Step S260, the acceleration monitoring unit 120 determines whether the excess acceleration duration time WU is equal to or greater than the acceleration determination time WH. When the excess acceleration duration time WU is less than the acceleration determination time WH (Step S260: NO), the acceleration monitoring unit 120 temporarily ends a series of processes of the acceleration monitoring process. Then, the acceleration monitoring unit 120 performs again the process of Step S200.

On the other hand, when it is determined in Step S260 that the excess acceleration duration time WU is equal to or greater than the acceleration determination time WH (Step S260: YES), the acceleration monitoring unit 120 causes the process routine to proceed to Step S270. Here, the acceleration monitoring unit 120 repeatedly performs the acceleration monitoring process as described above. When the excess acceleration duration time WU is repeatedly updated without causing the determination result of Step S200 or S240 to be negative in this course of repetition, the excess acceleration duration time WU increases and the determination result of Step S260 becomes positive finally.

In Step S270, the acceleration monitoring unit 120 detects that the vehicle 500 is in the excess acceleration state. Then, the acceleration monitoring unit 120 causes the process routine to proceed to Step S280. The processes of Step S230 to S270 are the acceleration-based detection process N3.

In Step S280, the acceleration monitoring unit 120 outputs a fail-safe execution signal to the internal combustion engine control unit 102. When the fail-safe execution signal is acquired, similarly to the torque monitoring process, the internal combustion engine control unit 102 performs fail-safe control such that the output of the internal combustion engine 10 is stopped. The process of causing the acceleration monitoring unit 120 to output the fail-safe execution signal and the process of causing the internal combustion engine control unit 102 to perform fail-safe control on the internal combustion engine 10 as a result of the process are the fail-safe process SS. As described above in the torque monitoring process, when the fail-safe execution signal is acquired during execution of the fail-safe control, the internal combustion engine control unit 102 does not respond to the fail-safe execution signal. Accordingly, for example, even when the fail-safe control is being performed in response to the fail-safe execution signal output in the torque monitoring process and the fail-safe execution signal is acquired in the acceleration monitoring process, the internal combustion engine control unit 102 does not perform the fail-safe control again but ends the fail-safe control when a predetermined time elapses from a time point at which the fail-safe control has been started in response to the first fail-safe execution signal.

When the process of Step S280 has been completed, the acceleration monitoring unit 120 temporarily ends a series of processes of the acceleration monitoring process. Then, the acceleration monitoring unit 120 performs again the process of Step S200. Operations in this embodiment will be described below.

The torque difference T3 which is used in the torque monitoring process and the acceleration difference W3 which is used in the acceleration monitoring process are calculated based on detection values from different sensors. Specifically, the torque difference T3 is calculated based on detection values from various sensors of the internal combustion engine 10. On the other hand, the acceleration difference W3 is calculated based on the detection acceleration WD from the acceleration sensor 68.

For example, when an abnormality occurs in the air flowmeter 32 or a communication system thereof, the torque monitoring unit 130 cannot acquire the amount of intake air GA which is required to calculate the torque difference T3. When the vehicle 500 enters the excess acceleration state in this situation, the torque monitoring unit 130 cannot detect the excess acceleration state of the vehicle 500. On the other hand, even in this situation, the acceleration monitoring unit 120 can detect the excess acceleration state of the vehicle 500 through the acceleration monitoring process.

For example, when an abnormality occurs in the acceleration sensor 68 or a communication system thereof, the acceleration monitoring unit 120 cannot acquire the detection acceleration WD which is required to calculate the acceleration difference W3. When the vehicle 500 enters the excess acceleration state in this situation, the acceleration monitoring unit 120 cannot detect the excess acceleration state of the vehicle 500. On the other hand, even in this situation, the torque monitoring unit 130 can detect the excess acceleration state of the vehicle 500 through the torque monitoring process.

Advantages of this embodiment will be described below.

(1) As described above, the torque monitoring unit 130 and the acceleration monitoring unit 120 detect an excess acceleration state using detection values from sensors of which detection objects are different from each other. Accordingly, even when an abnormality occurs in a sensor or a communication system associated with one of the torque monitoring unit 130 and the acceleration monitoring unit 120, the other thereof is not affected thereby. In this way, by monitoring for an excess acceleration state of a vehicle using two independent parameters including the output torque of the internal combustion engine and the acceleration of the vehicle, it is possible to accurately detect the excess acceleration state using at least one of the two parameters. Accordingly, it is possible to prevent omission of detection of the excess acceleration state.

(2) In the aforementioned configuration, the acceleration determination time WH is set to be longer than the torque determination time TH in consideration of the fact that errors or noise included in the detection acceleration WD detected by the acceleration sensor 68 is greater than errors or noise included in detection values from various sensors of the internal combustion engine. Accordingly, with the acceleration detection process, it is possible to prevent erroneous detection of the excess acceleration state due to noise without newly employing an acceleration sensor 68 that can accurately remove the noise or without newly adding a process of removing noise.

(3) In the aforementioned configuration, the acceleration difference W3 is calculated using a very simple calculation expression. Specifically, the required acceleration W1 is calculated by only dividing the required driving force F by the weight of the vehicle 500. The actual acceleration W2 is the detection acceleration WD detected by the acceleration sensor 68. Accordingly, it is possible to simplify the process of calculating the acceleration difference W3 and to minimize an increase in processing load of the acceleration monitoring process.

(4) In the aforementioned configuration, the precondition for measurement of the acceleration monitoring process includes the condition (NJ2) that the vehicle speed SP is equal to or higher than the stop determination vehicle speed. That is, the acceleration monitoring unit 120 measures the excess acceleration duration time WU when the vehicle speed SP is equal to or higher than the stop determination vehicle speed. Accordingly, immediately before the vehicle 500 stops or immediately after the vehicle 500 starts, the excess acceleration duration time WU is not measured even when the acceleration of the vehicle 500 increases such that the acceleration difference W3 is equal to or greater than the acceleration threshold value WH. With this configuration, the fail-safe process SS is not unnecessarily performed due to detection of the excess acceleration state immediately before the vehicle 500 stops. Immediately after the vehicle 500 starts, measurement of the excess acceleration duration time WU is permitted after the vehicle speed SP becomes equal to or greater than the stop determination vehicle speed, that is, after the vehicle speed SP is increased to a certain extent. Accordingly, the fail-safe process SS is not performed due to detection of the excess acceleration state immediately after the vehicle 500 starts. As a result, when a driver intends to increase the vehicle speed SP immediately after the vehicle starts, traveling performance of the vehicle 500 does not deteriorate due to stopping of the output of the internal combustion engine 10.

(5) In the aforementioned configuration, the precondition for measurement of the acceleration monitoring process includes the condition (NJ3) that the automatic transmission 50 is not performing gear shift. That is, the acceleration monitoring unit 120 measures the excess acceleration duration time WU when the automatic transmission 50 is not performing gear shift. Accordingly, the excess acceleration state which is an abnormal traveling state of the vehicle 500 can be detected separately from the gear shift operation of the automatic transmission 50 which is a normal operation of the vehicle 500.

(6) In the aforementioned configuration, the precondition for measurement of the acceleration monitoring process includes the condition (NJ4) that the vehicle 500 is not slipping down on an uphill road. That is, the acceleration monitoring unit 120 measures the excess acceleration duration time WU when the vehicle 500 is not slipping down. Accordingly, when the vehicle 500 is slipping down, the excess acceleration duration time WU is not measured even when the acceleration of the vehicle 500 increases such that the acceleration difference W3 is equal to or greater than the acceleration threshold value WH. With this configuration, when the vehicle 500 is slipping down, the output of the internal combustion engine 10 is not stopped due to detection of the excess acceleration state.

The acceleration of the vehicle 500 may increase instantaneously when the vehicle 500 travels forward after a slip-down has been settled. That is, a state in which the acceleration of the vehicle 500 is large is likely to continue after the vehicle has slipped down as well as when the vehicle is slipping down. When the excess acceleration duration time WU is measured to include a period from a time point at which the vehicle 500 starts slip-down to a time point at which the vehicle 500 travels forward after the slip-down has been settled, the excess acceleration duration time WU may be equal to or greater than the acceleration determination time WH. On the other hand, like this configuration, when the excess acceleration duration time WU is measured only after the slip-down has been settled, the excess acceleration duration time WU is not equal to or greater than the acceleration determination time WH. Accordingly, when the slip-down of the vehicle 500 has been settled, the output of the internal combustion engine 10 is not stopped due to detection of the excess acceleration state.

This embodiment can be modified as follows. This embodiment and the following modified examples can be combined with each other unless any technical confliction arises.

- The acceleration threshold value WZ is not limited to the example described in the aforementioned embodiment. The acceleration threshold value WZ can be appropriately set depending on an excess of the acceleration which is to be detected. The acceleration threshold value WZ may be set to be variable depending on the traveling state of the vehicle 500. For example, the acceleration threshold value WZ may be set to decrease as the vehicle speed SP increases.
- The torque threshold value TZ is not limited to the example described in the aforementioned embodiment. The torque threshold value TZ can be appropriately set depending on an excess of the output torque which is to be detected similarly to the acceleration threshold value WZ. The torque threshold value TZ may be different from the output torque of the internal combustion engine 10 which is required to cause the acceleration of the acceleration threshold value WZ in the vehicle 500. The torque threshold value TZ may be set to be variable depending on the traveling state of the vehicle 500 similarly to the acceleration threshold value WZ.
- The acceleration determination time WH is not limited to the example described in the aforementioned embodiment. The acceleration determination time WH can be determined in consideration of a necessity of deceleration of the vehicle 500 with a balance with the acceleration threshold value WZ. When detection accuracy of the acceleration sensor 68 is improved, constraints on setting of the acceleration determination time WH due to the detection accuracy of the acceleration sensor 68 are cancelled. The acceleration determination time WH may be set to a value equal to the torque determination time TH or a value less than the torque determination time TH.
- The torque determination time TH is not limited to the example described in the aforementioned embodiment. The torque determination time TH can be determined in consideration of a necessity of deceleration of the vehicle 500 with a balance with the torque threshold value TZ. For example, when detection accuracy of various sensors of the internal combustion engine 10 is improved, constraints on setting of the torque determination time TH due to the detection accuracy of the various sensors of the internal combustion engine 10 are cancelled. The torque determination time TH may be set to a value equal to the acceleration determination time WH or a value greater than the acceleration determination time WH.
- The measure for releasing the excess acceleration state of the vehicle 500 which is performed in the fail-safe process is not limited to the example described in the aforementioned embodiment. For example, when the torque threshold value TZ or the acceleration threshold value WZ is set to be small or the torque determination time TH or the acceleration determination time WH is set to be short, the excess acceleration state of the vehicle 500 is detected even when the necessity of deceleration of the vehicle 500 is low. In this case, the measure for releasing the excess acceleration state of the vehicle 500 may include only decreasing the output of the internal combustion engine 10 instead of stopping the output of the internal combustion engine 10. The measure for releasing the excess acceleration state of the vehicle 500 may include turning on a warning lamp or ringing a buzzer. The measure for releasing the excess acceleration state of the vehicle 500 may include detecting the excess acceleration state and storing information indicating the detection in the storage unit 101. The measure for releasing the excess acceleration state of the vehicle 500 has only to be suitable for the necessity of deceleration of the excess acceleration state to be detected.
- The configuration of the control device 100 and details of the processes which are performed by the functional units thereof are not limited to the example described in the aforementioned embodiment. For example, when details of the measure for releasing the excess acceleration state are modified from the example described in the aforementioned embodiment as in the aforementioned modified example, details of the processes which are performed by the control device 100 can be appropriately set such that the measure can be appropriately performed. The functional units of the control device 100 in the aforementioned embodiment may be caused to perform processes different from those in the aforementioned embodiment, or functional units different from those in the aforementioned embodiment may be provided in the control device 100. The control device 100 has only to have a configuration that can perform the required torque calculating process, the actual torque calculating process, the torque-based detection process, the required acceleration calculating process, the actual acceleration calculating process, the acceleration-based detection process, and the fail-safe process.
- The methods of determining whether the precondition for measurement of the torque monitoring process and the precondition for measurement of the acceleration monitoring process have been satisfied are not limited to the example described in the aforementioned embodiment. For example, details of the method of determining whether the automatic transmission 50 is performing gear shift in association with the condition (NJ3) may be modified from those of the aforementioned embodiment. Here, when the automatic transmission 50 is performing gear shift, the rotation speed 52Y of the output shaft 52 of the automatic transmission 50 is substantially constant. On the other hand, the rotation speed 51Y of the input shaft 51 changes. Therefore, only the rotation speed 51Y of the input shaft 51 may be used as the parameter for determining whether the automatic transmission 50 is performing gear shift. Whether the automatic transmission 50 is performing gear shift may be determined based on a differential value of the rotation speed 51Y of the input shaft 51.

The method of determining whether the vehicle 500 is slipping down in the condition (NJ4) may be modified from details of the aforementioned embodiment. For example, whether the vehicle 500 is slipping down may be determined using the detection acceleration WD detected by the acceleration sensor 68 and the rotational position 52V of the output shaft 52 of the automatic transmission 50 detected by the output shaft rotation sensor 65. Here, when the vehicle 500 slips down and a brake operates at the time of starting on an uphill road, the detection acceleration WD detected by the acceleration sensor 68 has a positive value. On the other hand, the differential value of the rotation speed 52Y of the output shaft 52 of the automatic transmission 50, that is, the acceleration based on the rotation speed 52Y of the output shaft 52, at that time has a negative value. Therefore, when the detection acceleration WD is positive and the differential value of the rotation speed 52Y of the output shaft 52 is negative, it may be determined that the vehicle 500 is slipping down.

Details of the precondition for measurement of the torque monitoring process are not limited to the example described in the aforementioned embodiment. Another condition may be employed instead of or in addition to the condition (MJ1). The number of preconditions for measurement is not particularly limited.

For example, when determination of the condition (MJ1) is not necessary such as when a sensor is a new product state, the condition (MJ1) may be disused. In this case, various parameters associated with calculation of the torque difference T3 can be acquired at a time point different from the time point at which it is determined whether the condition (MJ1) has been satisfied. For example, necessary parameters can be acquired at a time point at which the required torque T1 or the actual torque T2 is calculated.

Details of the precondition for measurement of the acceleration monitoring process are not limited to the example described in the aforementioned embodiment. Another condition may be employed instead of or in addition to the conditions (NJ1) to (NJ4). The number of preconditions for measurement may be three or less. The number of preconditions for measurement is not particularly limited.

For example, when determination of the condition (NJ1) is not necessary such as when a sensor is a new product state, the condition (NH) may be disused. In this case, various parameters associated with calculation of the acceleration difference W3 can be acquired at a time point different from the time point at which it is determined whether the condition (NJ1) has been satisfied. For example, necessary parameters can be acquired at a time point at which the required acceleration W1 or the actual acceleration W2 is calculated.

The condition (NJ2) may be disused. For example, as long as the output of the internal combustion engine 10 is neither stopped nor decreased in the fail-safe process, disuse of the condition (NJ2) does not cause any problem in traveling of the vehicle 500.

The condition (NJ3) may be disused. For example, when it is necessary to detect that the vehicle 500 is in the excess acceleration state including the acceleration due to the gear shift operation of the automatic transmission 50, the condition (NJ3) is not necessary.

The condition (NJ4) may be disused. Like the condition (NJ2), for example, as long as the output of the internal combustion engine 10 is neither stopped nor decreased in the fail-safe process, disuse of the condition (NJ4) does not cause any problem in traveling of the vehicle 500.

The entire configuration of the vehicle 500 is not limited to the example described in the aforementioned embodiment. For example, a stepless transmission may be employed instead of the automatic transmission 50. A motor generator having functions of both an electric motor and a power generator may be mounted as a drive source of the vehicle 500. A battery that stores electric power generated by the motor generator may be mounted in the vehicle 500.

The method of calculating the vehicle speed is not limited to the example described in the aforementioned embodiment. For example, the vehicle speed may be calculated based on the rotation speed 52Y of the output shaft 52 of the automatic transmission 50.

The method of calculating the required torque T1 is not limited to the example described in the aforementioned embodiment. The required torque T1 has only to be calculated based on the accelerator operation amount ACP. For example, when the motor generator and the battery are mounted in the vehicle 500 as in the aforementioned modified example, it is preferable to calculate the required torque T1 in consideration of a state of charge of the battery.

The method of calculating the actual torque T2 is not limited to the example described in the aforementioned embodiment. The actual torque T2 has only to be calculated based on the operating state of the internal combustion engine 10. The parameter indicating the operating state of the internal combustion engine 10 is not limited to the example described in the aforementioned embodiment. The parameter indicating the operating state of the internal combustion engine 10 may be, for example, an amount of injected fuel. The method of calculating the actual torque T2 can be appropriately changed depending on the parameter which is used to calculate the actual torque T2.

The method of calculating the required acceleration W1 is not limited to the example described in the aforementioned embodiment. The required acceleration W1 has only to be calculated based on the accelerator operation amount ACP. For example, the required acceleration W1 may be calculated based on a degree of change of the accelerator operation amount ACP.

The method of calculating the actual acceleration W2 is not limited to the example described in the aforementioned embodiment. The actual acceleration W2 has only to be calculated based on the traveling state of the vehicle 500. The parameter indicating the traveling state of the vehicle 500 is not limited to the example described in the aforementioned embodiment. The acceleration of the vehicle 500 which is calculated as a differential value of the vehicle speed may be used as the parameter indicating the traveling state of the vehicle 500. A parameter other than the acceleration of the vehicle 500 may be used as the parameter indicating the traveling state of the vehicle 500. The method of calculating the actual acceleration W2 can be appropriately changed depending on the parameter which is used to calculate the actual acceleration W2.

One of the torque monitoring unit 130 and the acceleration monitoring unit 120 may be disused in some cases. The excess acceleration state may be detected by performing only one of the torque monitoring process and the acceleration monitoring process. For example, the excess acceleration state of the vehicle 500 may be monitored by performing only the acceleration monitoring process using the acceleration monitoring unit 120. This configuration is valid for decreasing a processing load in the control device 100. As long as only the acceleration monitoring process is performed, the acceleration monitoring process may be applied to an electric vehicle not including the internal combustion engine 10. Even when only the acceleration monitoring process is performed in this way, it is possible to detect the excess acceleration state regardless of normality/abnormality of the sensors or the like required to calculate the actual torque or the required torque.

A technical idea which can be understood from the aforementioned embodiment and the aforementioned modified examples will be described below:

A control device for a vehicle performing: a required acceleration calculating process of calculating a required acceleration which is a required value of an acceleration for the vehicle based on an amount of depression of an accelerator pedal of the vehicle; an actual acceleration calculating process of calculating an actual acceleration which is an actual acceleration of the vehicle based on a traveling state of the vehicle; an acceleration-based detection process of detecting an excess acceleration state of the vehicle when a duration time of a state in which a value obtained by subtracting the required acceleration from the actual acceleration is equal to or greater than a predetermined acceleration threshold value is equal to or greater than a predetermined acceleration determination time; and a fail-safe process of taking a measure for releasing the excess acceleration state when the excess acceleration state of the vehicle has been detected in the acceleration-based detection process.

What is claimed is:

1. A control device for a vehicle that is applied to a vehicle including an internal combustion engine which is a drive source, the control device performing:
   a required torque calculating process of calculating a required torque which is a required value of an output torque for the internal combustion engine based on an amount of depression of an accelerator pedal of the vehicle;
   an actual torque calculating process of calculating an actual torque which is an actual output torque of the internal combustion engine based on an operating state of the internal combustion engine;
   a torque-based detection process of detecting an excess acceleration state of the vehicle when a duration time of a state in which a value obtained by subtracting the required torque from the actual torque is equal to or greater than a predetermined torque threshold value is equal to or greater than a predetermined torque determination time;
   a required acceleration calculating process of calculating a required acceleration which is a required value of an acceleration for the vehicle based on the amount of depression of the accelerator pedal of the vehicle;
   an actual acceleration calculating process of calculating an actual acceleration which is an actual acceleration of the vehicle based on a traveling state of the vehicle;
   an acceleration-based detection process of detecting the excess acceleration state of the vehicle when a duration time of a state in which a value obtained by subtracting the required acceleration from the actual acceleration is equal to or greater than a predetermined acceleration threshold value is equal to or greater than a predetermined acceleration determination time; and
   a fail-safe process of taking a measure for releasing the excess acceleration state when the excess acceleration state of the vehicle has been detected in at least one of the torque-based detection process and the acceleration-based detection process.

2. The control device for a vehicle according to claim 1, wherein the torque threshold value is an output torque of the internal combustion engine which is required to cause an acceleration of the acceleration threshold value in the vehicle, and
   wherein the acceleration determination time is longer than the torque determination time.

3. The control device for a vehicle according to claim 1, wherein the acceleration-based detection process includes measuring the duration time of the state in which the value obtained by subtracting the required acceleration from the actual acceleration is equal to or greater than the acceleration threshold value on condition that a traveling speed of the vehicle is equal to or greater than a predetermined stop determination vehicle speed.

4. The control device for a vehicle according to claim 1, wherein the acceleration-based detection process includes measuring the duration time of the state in which the value obtained by subtracting the required acceleration from the actual acceleration is equal to or greater than the acceleration threshold value on condition that an automatic transmission connected to the internal combustion engine is not performing gear shift.

5. The control device for a vehicle according to claim 1, wherein the acceleration-based detection process includes measuring the duration time of the state in which the value obtained by subtracting the required acceleration from the actual acceleration is equal to or greater than the acceleration threshold value on condition that the vehicle is not traveling reversely on an uphill road.

6. A vehicle control program causing a control device that is applied to a vehicle including an internal combustion engine which is a drive source to perform:
   a required torque calculating process of calculating a required torque which is a required value of an output torque for the internal combustion engine based on an amount of depression of an accelerator pedal of the vehicle;
   an actual torque calculating process of calculating an actual torque which is an actual output torque of the internal combustion engine based on an operating state of the internal combustion engine;
   a torque-based detection process of detecting an excess acceleration state of the vehicle when a duration time of a state in which a value obtained by subtracting the required torque from the actual torque is equal to or greater than a predetermined torque threshold value is equal to or greater than a predetermined torque determination time;

a required acceleration calculating process of calculating a required acceleration which is a required value of an acceleration for the vehicle based on the amount of depression of the accelerator pedal of the vehicle;

an actual acceleration calculating process of calculating an actual acceleration which is an actual acceleration of the vehicle based on a traveling state of the vehicle;

an acceleration-based detection process of detecting the excess acceleration state of the vehicle when a duration time of a state in which a value obtained by subtracting the required acceleration from the actual acceleration is equal to or greater than a predetermined acceleration threshold value is equal to or greater than a predetermined acceleration determination time; and a fail-safe process of taking a measure for releasing the excess acceleration state when the excess acceleration state of the vehicle has been detected in at least one of the torque-based detection process and the acceleration-based detection process.

* * * * *